United States Patent Office.

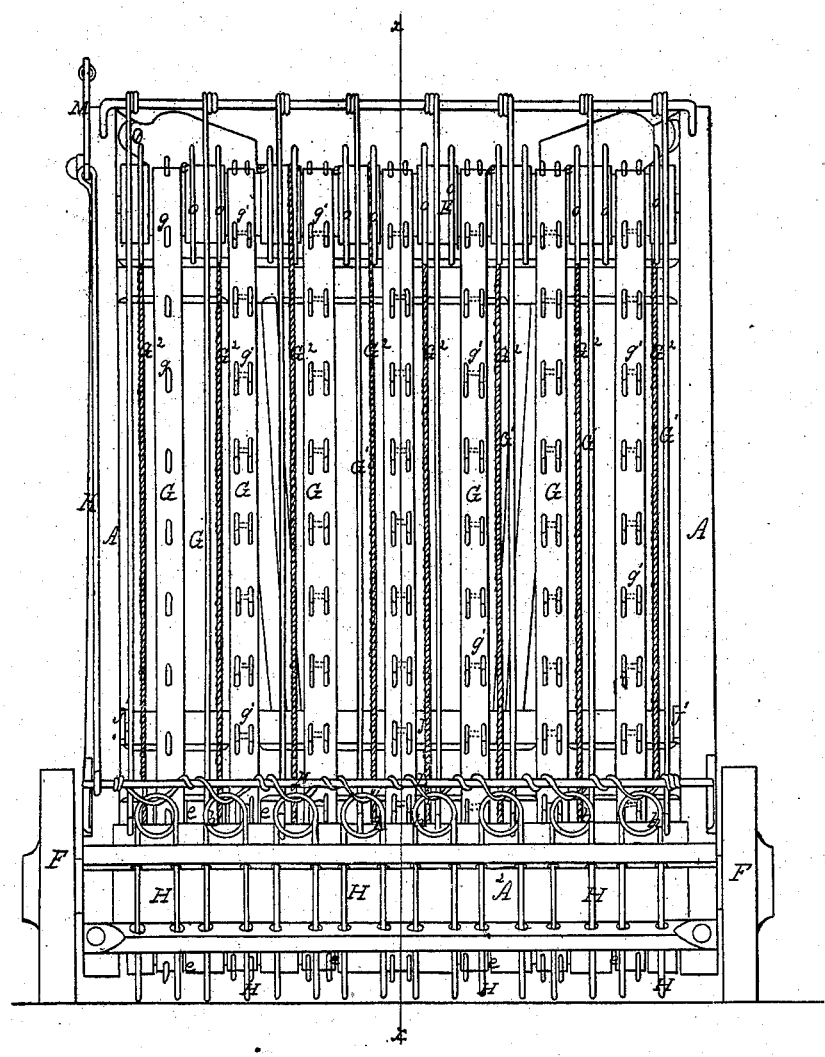

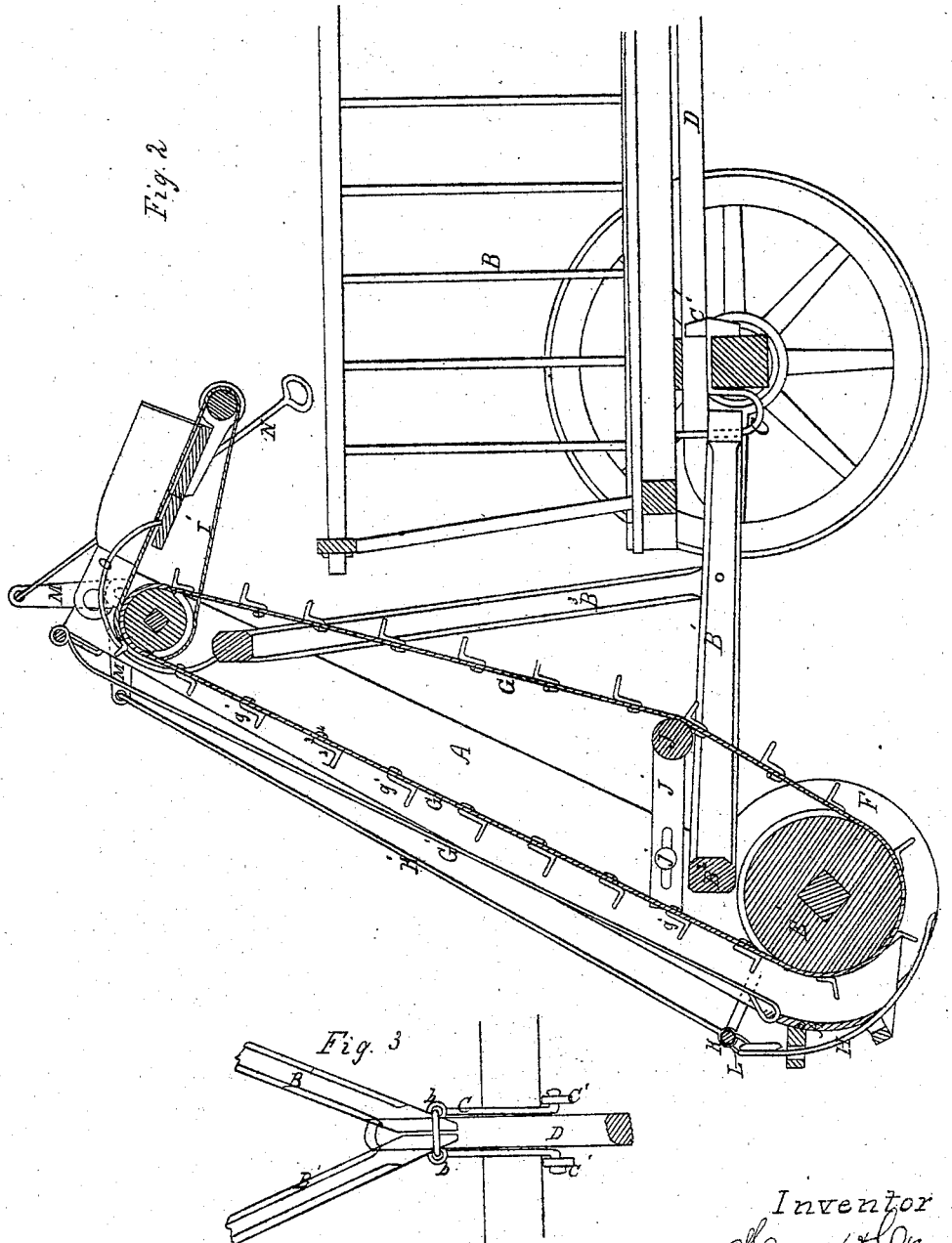

GEORGE W. SWARTZ, OF NEWBURG, PENNSYLVANIA.

Letters Patent No. 66,412, dated July 2, 1867.

---

IMPROVEMENT IN HAY-RAKERS AND LOADERS.

---

The Schedule referred to in these Letters Patent and making part of the same.

---

TO ALL WHOM IT MAY CONCERN:

Be it known that I, GEORGE W. SWARTZ, of Newburg, in the county of Cumberland, and State of Pennsylvania, have invented certain new and useful Improvements in Hay-Loaders; and I do hereby declare the following to be a full, clear, and exact description of the nature, construction, and operation of the same, reference being had to the accompanying drawings, which are made a part of this specification, and in which—

Figure 1 is a rear end elevation of a hay-loader embodying my improvements.

Figure 2 is a vertical central section of the same in the plane indicated by the line $x\ x$, fig. 1.

Figure 3 is a detached view illustrating the method of attaching the loader to the wagon.

Figure 4 is a detached view of the double elevating-tooth.

Similar letters of reference indicate corresponding parts in the several figures.

My invention relates to a machine which is attached to and travels with the wagon, for the purpose of raising the hay from the ground and depositing the same into the wagon.

The improvements consist, first, in the method of attaching the loader to the wagon; second, in the means for tightening and steadying the toothed, endless bands which elevate the hay; third, in the mode of spacing and holding said elevating bands upon the drums, about which they turn or revolve; fourth, in the peculiar construction of the teeth which rake up the hay upon the ground and deliver it to the elevating bands; fifth, in the manner of connecting the rake-teeth to their tripping or adjusting-rod; sixth, in the arrangement of wire guards at the upper end of the elevator, for raising the hay above the teeth of the elevating bands to liberate it from said teeth when about to be discharged into the wagon; seventh, in the peculiar manner of constructing and applying the teeth of the elevating bands.

In order that others skilled in the art to which my invention appertains may be enabled to fully understand and use the same, I will proceed to describe it in detail.

In the accompanying drawings, A A may represent the frame of the loader, which stands in an inclined position, with its upper end leaning toward the wagon, which is indicated by red lines at B, fig. 2. $B^1\ B^1$ represent the hounds of the loader, said hounds being attached to the frame A by means of the transverse bar $B^2$. $B^3$ may represent braces extending upward from the hounds $B^1$, to support the upper end of the frame A. The attachment between the loader and wagon is effected by means of the staple or coupling C and the keys or arms C′, which are pivoted on the forward ends of the legs of staple C, as shown in figs. 2 and 3. This staple C is screwed to the forward ends of the hounds $B^1\ B^1$ of the loader by means of the eye-bolts $b\ b$, fig. 3. When the loader is to be attached to the wagon the keys C′ are held in positions parallel with the horizontal legs of the staple C; then the legs and keys are passed through the openings, which are to be formed between the hind axle and its bolster; the keys then fall and connect the staple C securely to the wagon, while the coupling-pole D passes through the loop $c$ of the staple, and thus sustains the hounds of the loader, as shown clearly in figs. 2 and 3. E E′ are drums or rollers fitted to turn in the upper and lower end of the frame A respectively. The lower or driving-drum E′ receives motion from the wheels F F, upon which the loader is wheeled about with the wagon B. In the peripheries of the drums E E′ are formed a series of circumferential grooves, $e\ e\ e$, which correspond in number with and are adapted for the reception of the endless bands G G G, which may be provided with teeth $g$, or $g'$, whereby the hay is taken from the rake-teeth H H H and conveyed to the inclined table I, from which the hay is discharged into the wagon. The bands I′ facilitate the passage of the hay from the table I to the wagon. The grooves $e$ in the drums E E′ afford means for properly spacing or separating the bands in relation to each other, and these grooves also serve to maintain the parallelism of the bands when in operation. J is a roller attached to the frame A by slotted arms J′ J′ and set-screws $j\ j$, these attachments permitting the roller J to be adjusted so as to bear with more or less force upon the forward part of the bands G, for the purpose of tightening or steadying and slacking the bands G, as occasion may require. The rake-teeth H are curved so as to follow the contour of the drum E′, beneath which their lower ends work in contact with the ground. These rake-teeth are made in pairs, as shown in fig. 1, or, in other words, every two teeth are made out of a single piece of wire, and at their point of juncture the two teeth are made with a loop, $h$, which admits of the ready attachment of the rake-teeth to the adjusting-rod K, by means of the rope or cord L, which, being coiled around the rod and passed through the loops $h$, is made fast to the rod at its ends, as shown in fig. 1. This method of attaching the teeth H to the adjusting-rod K is simple and cheap, and the attachment can be easily effected and is susceptible of ready renewal. K' is a rod, pivoted or jointed at its lower end to the rod K, and at its upper end to the bell-crank lever M, which is operated by the handle N, which can be reached conveniently by the man upon the wagon. By means of the handle, lever, and connecting-rod, the rod K, to which the rake-teeth are attached, can be raised or lowered, and thus the rake H may be thrown into or out of operation at will. $G^1 G^1$ are a series of parallel wires, made fast at their ends to the top and bottom of frame A, and so arranged as to confine the hay upon the bands G, as it is in course of elevation towards the discharge table or incline I. When the hay reaches the upper end of the loader it is disengaged from the teeth of the elevator G by the curved wire-guards or rods O, which are arranged arch-wise over the upper roller or drum E, and serve to raise the hay above the teeth $g$ $g'$, so as to discharge it on to the incline I. $A^2$ is a curved guide, secured to the lower end of the frame A, behind the drum E', and employed for the purpose of retaining the hay upon the bands G until it is fairly under the confining-wires $G^1$. The teeth of the elevating bands may consist simply of straight pins, $g$, fig. 1, but I prefer the form of teeth represented at $g'$, figs. 1 and 2, and shown detached in fig. 4. Under the form shown at $g'$, two teeth are made of a single piece of wire, bent so as to form the hay-elevating projections 1 1, the bracing portions 2 2, the shanks 3, and the intermediate connecting part 4. The double teeth $g'$, thus formed, are inserted in the bands in the manner shown in fig. 2, where it will be seen that the shanks 3 have bearings in perforations in the bands G, while parts 1 1 project from the outer face of the bands to form the elevating teeth, and parts 2 at the outside, and parts 4 at the inside of the band, serve to brace and retain the double tooth in position. The double teeth $g'$ possess the advantage of being more easily manufactured and more securely applied than such as are commonly used for a like purpose.

This hay-loading apparatus is not essentially combined with any particular form of wagon, as it is only called into requisition and attached to the wagon as occasion may require, the wagon being used for other ordinary purposes, as the owner may see fit.

I propose to substitute plain cords or ropes for some of the elevating bands G, or to place them between the bands. Such cords or ropes are shown by the lines $G^2$, fig. 1, and they are designed to lessen the strain on the straps, by aiding to sustain the weight of the hay while being elevated. When the cords or ropes are employed, fewer straps will be needed, and the cost of the machine will be reduced proportionately.

Having thus described my invention, the following is what I claim as new herein, and desire to secure by Letters Patent:

1. I claim the coupling or staple C, and keys C', for attaching the loader to a wagon, substantially as described.
2. I claim the looped and curved double rake-teeth H, in combination with the guide $A^2$, and the drum E, substantially as and for the purpose described.
3. I claim the rope or cord L for attaching the rake-teeth H to their adjusting-rod K, as and for the purpose specified.

To the above specification of my improved hay-loader I have signed my hand this 18th of October, 1866.

GEORGE W. SWARTZ.

Witnesses:
SOLON C. KEMON,
CHAS. D. SMITH.